United States Patent
Ayyash

(10) Patent No.: US 11,229,219 B1
(45) Date of Patent: Jan. 25, 2022

(54) CAMEL-MILK PRODUCTS WITH PLANT-BASED PROTEIN ADDITIVE

(71) Applicant: UNITED ARAB EMIRATES UNIVERSITY, Al Ain (AE)

(72) Inventor: Mutamed Mohammad Ayyash, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/026,125

(22) Filed: Sep. 18, 2020

(51) Int. Cl.
| | |
|---|---|
| *A23C 9/133* | (2006.01) |
| *A23C 9/123* | (2006.01) |
| *A23C 19/05* | (2006.01) |
| *A23C 19/055* | (2006.01) |
| *A23L 33/185* | (2016.01) |
| *A23C 9/13* | (2006.01) |

(52) U.S. Cl.
CPC ............ *A23C 9/1315* (2013.01); *A23C 9/123* (2013.01); *A23C 19/054* (2013.01); *A23C 19/055* (2013.01); *A23L 33/185* (2016.08)

(58) Field of Classification Search
CPC ..... A23C 9/1315; A23C 9/123; A23C 19/054; A23C 19/055; A23L 33/185
See application file for complete search history.

(56) References Cited

U.S. PATENT DOCUMENTS

| | | | | |
|---|---|---|---|---|
| 5,945,151 A | * | 8/1999 | Sato .................... | A23C 20/025 426/634 |
| 10,336,817 B2 | | 7/2019 | Hasson et al. | |
| 2002/0164696 A1 | * | 11/2002 | Kappeler ............. | C12N 9/6483 435/69.1 |
| 2003/0068406 A1 | * | 4/2003 | Nair ...................... | A23C 9/137 426/34 |
| 2009/0081329 A1 | * | 3/2009 | Van Dijk ............. | A23C 19/054 426/40 |
| 2015/0099036 A1 | * | 4/2015 | Aichinger ............ | A23C 9/1315 426/71 |

FOREIGN PATENT DOCUMENTS

| | | |
|---|---|---|
| CN | 104186670 A | 12/2014 |
| CN | 104222479 A | 12/2014 |
| CN | 107996715 A | 5/2018 |
| CN | 108522652 A | 9/2018 |
| CN | 110122590 A | 8/2019 |
| JP | 2007-295877 A | 11/2007 |

OTHER PUBLICATIONS

Shori, A. B., "Antioxidant activity and viability of lactic acid bacteria in soybean-yogurt made from cow and camel milk," Journal of Taibah University for Science 7 (2013) 202-208 (Year: 2013).*

Ramet, J. P., "The technology of making cheese made from camel milk (*Camelus dromedarius*)", FAO Animal Production and Health Paper 113 (Year: 2001).*

Al-hamdani et al., "Effect of Lupin (*Lupinus albifrons*) Flour on Microbial and sensory properties of local Yoghurt," Advances in Life Science and Technology, vol. 34, 2015.

* cited by examiner

*Primary Examiner* — Jeffrey P Mornhinweg

(74) *Attorney, Agent, or Firm* — Nath, Goldberg & Meyer; Richard C. Litman

(57) ABSTRACT

The camel-milk products with plant-based protein additives include camel milk in the form of plant-based milk, plant-based milk powder and/or derivatives thereof and have enhanced gel strength. The plant-based protein additives may be derived from soybeans; oats; almonds; lupin chickpeas or navy beans. The camel-milk products include fermented and non-fermented camel-milk products, such as: set and stir yogurt; all cheese varieties; cultured camel milks; and custard-based products. The camel-milk products are prepared by mixing camel milk with plant-based protein additives to form a mixture and coagulating the mixture by acid or enzyme treatment.

17 Claims, 3 Drawing Sheets ates to camel's milk products, and particularly to camel-milk products with plant-based protein additive for enhanced gel strength for making cheeses, yogurt, ice cream and other products from camel's milk.

CAMEL-MILK PRODUCTS WITH PLANT-BASED PROTEIN ADDITIVE

BACKGROUND

1. Field

The disclosure of the present patent application relates to camel's milk products, and particularly to camel-milk products with plant-based protein additive for enhanced gel strength for making cheeses, yogurt, ice cream and other products from camel's milk.

2. Description of the Related Art

Products made from camel milk, including pasteurized camel milk, ice-cream, cheese, camel milk powder, latte coffees, and camel milk soap, are sold in many countries. Camel milk and camel-milk products provide many health benefits, including antihypertensive, hypoglycemic, hypoallergenic, and hypocholesterolemia effects. Camel milk contains well-balanced nutrients, is high in vitamin C and niacin, is richer in Cu and Fe than bovine milk, and mimics human milk in lacking β-lactoglobulin, while containing α-lactalbumin. In particular, camel milk contains biological components suitable for fermented milk production.

However, making set-yogurt and cheese products from camel milk faces serious challenges. Camel milk takes longer to coagulate than bovine milk and forms a fragile gel during yogurt and cheese processing. The weak gel formation in camel milk has been attributed to the composition of caseins therein, the type and composition of whey proteins, the concentration of calcium and phosphorus, the casein micelle size and the fat globule size of camel milk. Camel milk's casein micelles contain a low proportion of κ-casein (~3.4%) compared to bovine milk (~13.0%). This may result in a brittle gel that is unsuitable for manufacturing yogurt or cheese. The lack of β-lactoglobulin in camel milk is considered among the major factors hampering gelation. This leads to unsteady and weak connections between denatured whey proteins and caseins in thermally treated camel milk. Previous studies on camel milk reported that after 18 h of incubation with starter cultures, camel milk failed to form a gel-like structure. Rheological and microscopic characterizations showed that camel milk coagulum does not feature curd formation.

Slight improvements of gel strength in camel milk and camel-milk products have been achieved by various means, including varying cooking temperature, adjusting salt concentrations and pH, adding chymosin, adding other animal milks, and high-pressure processing (HPP). Various hydrocolloids, such as gelatin or alginate, have been used to alter gel formation in fermented camel milk. Hydrocolloids improve water holding capacity in yogurt made from camel milk, but it is not clear whether hydrocolloids interact with the protein network in fermented camel milk. Moreover, consumers generally do not prefer to consume dairy products with other animal additives.

Plant-based or non-dairy milk alternatives are a fast-growing food product market. Plant-based milk alternatives are fluids that result from breakdown (size reduction) of plant material (cereals, pseudo-cereals, legumes oilseeds, nuts, etc.) extracted in water and further homogenization, resulting in particle size distributions in the range of 5-20 μm, which imitates cow milk in appearance and consistency. A general classification of plant-based/vegetable milk alternatives may include five categories, as follows: (a) cereal-based, such as oat milk, rice milk, corn milk, spelt milk; (b) legume-based, such as soy milk, peanut milk, lupin milk, cowpea milk; (c) nut-based, such as almond milk, coconut milk, hazelnut milk, pistachio milk, walnut milk; (d) seed-based, such as sesame milk, flax milk, hemp milk, sunflower milk; and (e) pseudo-cereal based, such as quinoa milk, teff milk, amaranth milk. Plant-based proteins possess various nutritional, chemical and physical properties that may be useful in other contexts, including structure stability.

Thus, camel-milk products with plant-based protein additive solving the aforementioned problems are desired.

SUMMARY

The camel-milk product with plant-based protein additive is a mixture of camel milk and at least one plant-based protein additive. The plant-based protein additive may be a plant-based milk, a plant-based powder, or a derivative thereof. The camel-milk product has a gel strength higher than a corresponding camel-milk based product made without the plant-based protein additive. The ratio of plant-based protein additive to camel milk may be adjusted in order to control a gel strength of the camel-milk product. The camel milk product may be a fermented product.

A method of making the camel-milk product with plant-based protein additive may include steps of: mixing camel milk with a plant-based protein additive to form a mixture and adding a coagulant and/or performing heat treatment. The coagulant may be an acid, a lactic acid bacteria, or an enzyme. In the case of a lactic acid bacteria, the method may include a fermentation step.

These and other features of the present teachings will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
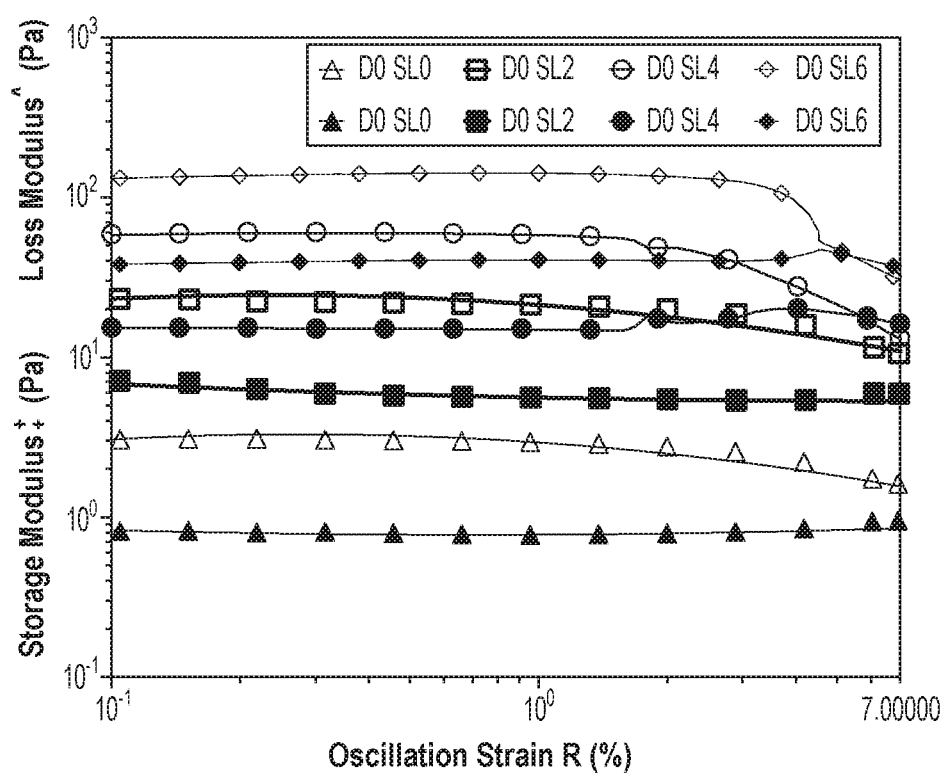
FIG. 1 is a plot of storage modulus and loss modulus as a function of oscillatory strain for mixtures of camel-milk products with plant-based protein additive for different concentrations of additive.

The camel-milk products with plant-based protein additive is a mixture of camel milk and at least one plant-based protein additive, wherein the plant-based protein additive may be a plant-based milk, a plant-based powder, or a derivative thereof. The ratio of plant-based protein additive to camel milk may be adjusted in order to control a gel strength of the camel-milk product. In particular, the camel milk-based product may include plant-protein from the plant-protein source in an amount of 1-10% wt/vol, or 2-8% wt/vol or 4-6% wt/vol.

The camel milk can be any type of camel milk, including, for example, whole camel milk, skimmed camel milk, semi-skimmed camel milk, evaporated camel milk, condensed camel milk, camel milk cream, powdered camel milk and reconstituted powdered camel milk. The camel milk may be added in an amount that the camel-milk product includes a desired amount of camel milk solids. In some embodiments, the camel-milk product includes 10-15% (wt./vol) camel milk solids, and in a particular embodiment, the camel-milk product includes 12.5% camel milk solids.

The plant-based protein additive may be a plant-based milk, a plant-based milk powder, or a derivative thereof. The plant-based protein additive may be derived from any of oat, soybean, lupin, quinoa, chickpea, or navy-beans.

In some embodiments, the camel-milk product is a fermented product. For example, the camel-milk product may be a yogurt, wherein the yogurt may be a set yogurt, stir yogurt, drinking yogurt, frozen yogurt or concentrated yogurt (i.e., labneh or labeneh, greek yogurt or strained yogurt). The camel-milk product may be a heat-treated fermented milk. In some embodiments, the camel-milk product is a cheese. The camel-milk product may also be a non-fermented product, such as a cheese or a custard-based product (i.e., an ice cream, a gelato or a pudding).

A method of making the camel-milk products with plant-based protein additive may include steps of mixing a camel milk with a plant-based protein additive to form a mixture and adding a coagulant and/or performing heat treatment. The coagulant may be an acid, a lactic acid bacteria or an enzyme. In the case of a lactic acid bacteria, the method may include a fermentation step. In some embodiments, the enzyme may be chymosin, and may be added alone or in rennet. Any other suitable enzyme capable of deactivating κ-casein to allow coagulation of the camel milk may be used. The method may include an initial step of standardizing the fat-solid content of the camel milk to a desired content. The method may also include an additional step of adjusting an initial ratio of casein content to fat solids content of the camel milk, or a ratio of camel milk non-fat solids to camel milk fat solids.

It should be understood that the amounts of materials for the methods described herein are exemplary, and appropriate scaling of the amounts are encompassed by the present subject matter, as long as the relative ratios of materials are maintained. As used herein, the term "about," when used to modify a numerical value, means within ten percent of that numerical value.

The camel-milk products with plant-based protein additive will be better understood by reference to the following examples.

Example 1

Exemplary Camel-Milk Products with Plant-Based Protein Additive—Gel Strength

To demonstrate the improved gel strength of the camel-milk products with plant-based protein additive, an exemplary camel-milk product was prepared and tested for rheological effects of various amounts of plant-based protein additive. The results of these tests are shown in FIGS. 1-3B. In short, camel milk was mixed with plant-based milks and subjected to fermentation using a lactic acid bacteria.

The plant-based milk used in the exemplary camel-milk products whose measurements are reflected in the present figures is from soybean (*Glycine max*). However, oat (*Avena sativa*), lupin (*Lupinus albus*), quinoa (*Chenopodium quinoa*), chickpea (*Cicer arietinum*), and navy bean (*Phaseolus vulgaris*) based milks were also used to prepare analagous camel-milk products with plant-based protein additive. The plant-based milk was added to the camel milk in liquid form in the present examples, and prepared directly from the beans or seeds of the respective plants by homogenizing with water according to the following procedure, First, 500 grams of beans/seeds were washed several times and then soaked in distilled water overnight at room temperature (3000 L dd-water) overnight (at least 12 h) while covered. Second, the soak water was decanted from the beans/seeds. Third, the drained beans/seeds were hand-washed thoroughly. Fourth, the washed beans/seeds were placed in a mixer grinder (blender) and blended for 10-15 min with 1200 ml of distilled water. Fifth, the resulting slurry was filtered through two layers of cheese-cloth and distilled water was added to achieve a final volume 2000 ml as a final plant-based milk. Sixth, the final plant-based milk was kept in the fridge at 4° C., well sealed, until use, which was typically the next day.

Camel milk powder was used in the exemplary camel-milk products whose properties are presented in FIGS. 1-3. In particular, full-fat camel milk powder produced by a dairy company, Al-Ain Dairy Farm (www.alainfarms.com), was used. The gross composition of the reconstituted camel milk powder was approximately moisture 86%, protein 3%, fat 3%, carbohydrate 4%, and ash <0.9%. The camel milk was produced by one-humped *Camelus dromedaries* and/or also by the two-humped *Camelus bactrianus*. Similar exemplary camel-milk product was also made from fresh pasteurized camel milk with similar gross composition. The fresh, pasteurized camel milk was purchased from a local supermarket and transfer to the university labs in an ice-cooled container. The camel milk was processed immediately to make the fermented product.

Two types of commercial cultures typically used to produced cow yogurt, CH and YF, were tested for the present procedure. CH is the commercial culture most commonly used to produce yogurt in the dairy industry. These cultures are sold by a commercial company, such as Chr-Hansen and Danesco. Any commercial or non-commercial culture capable of fermenting the camel-milk product may be used. FIGS. 1-3B represent results using CH starter culture, but similar results were achieved using YF. The CH-starter culture comprises two lactic acid bacteria species, *Lactobacillus bulgaricus* and *Streptococcus thermophilus*. In the drawings, CH FREQ is the frequency test for the samples fermented by CH culture. In general, the starter culture was added to obtain a ratio of 1% to 2% by volume of the total camel milk/plant-based protein additive mixture after mixing the camel milk with the plant-based milk. If the direct-in-vat culture was used as a powder form, then the percentage will be according to the manufacturing instructions.

The camel milk and the plant-based milk mixture was heated at 73° C./15 seconds, 85° C./15 min, or 90-95° C./5 min to complete the process.

The following are rheological tests performed and the results thereof that exhibit the clear differences between the fermented camel-milk products with and without the exemplary plant-based milk prepared as above.

Example 2

Rheological Properties of the Exemplary Camel-Milk Products

Rheological property measurement protocols called for the changes in storage modulus (G'), loss modulus (G"), viscosity, and loss tangent to be assessed for the exemplary camel-milk product during fermentation and storage. Non-destructive small-strain dynamic oscillatory measurements were performed with a cup-and-bob geometry rheometer (Peltier Concentric Cylinder, TA instruments, USA). During camel milk fermentation, the temperature of the rheometer was set at 40° C. Inoculated milk was aseptically transferred to the rheometer. The milk surface of the measuring geometry was covered with vegetable oil to avoid evaporation. An oscillatory frequency of 1 Hz, with 0.5% strain, was applied to milk during the entire fermentation period.

Figure 2A:
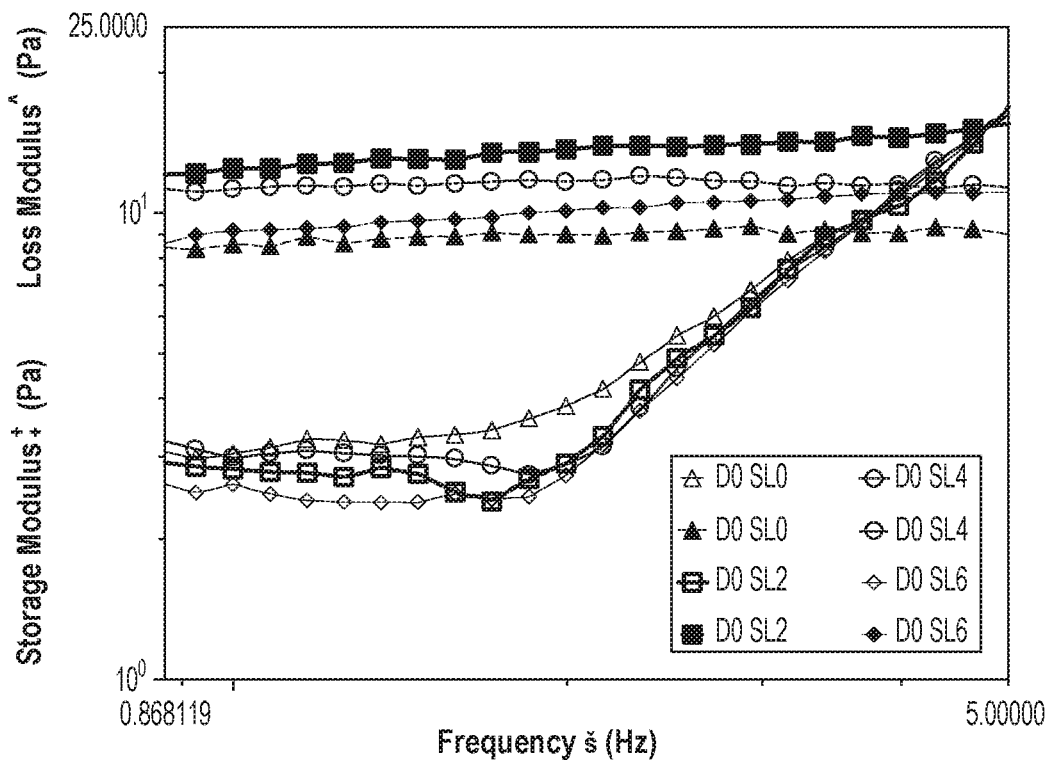
FIG. 2A is a plot of storage modulus and loss modulus as a function of oscillatory frequency for mixtures of camel-milk products with plant-based protein additive for different concentrations of additive at day zero.
Figure 2B:
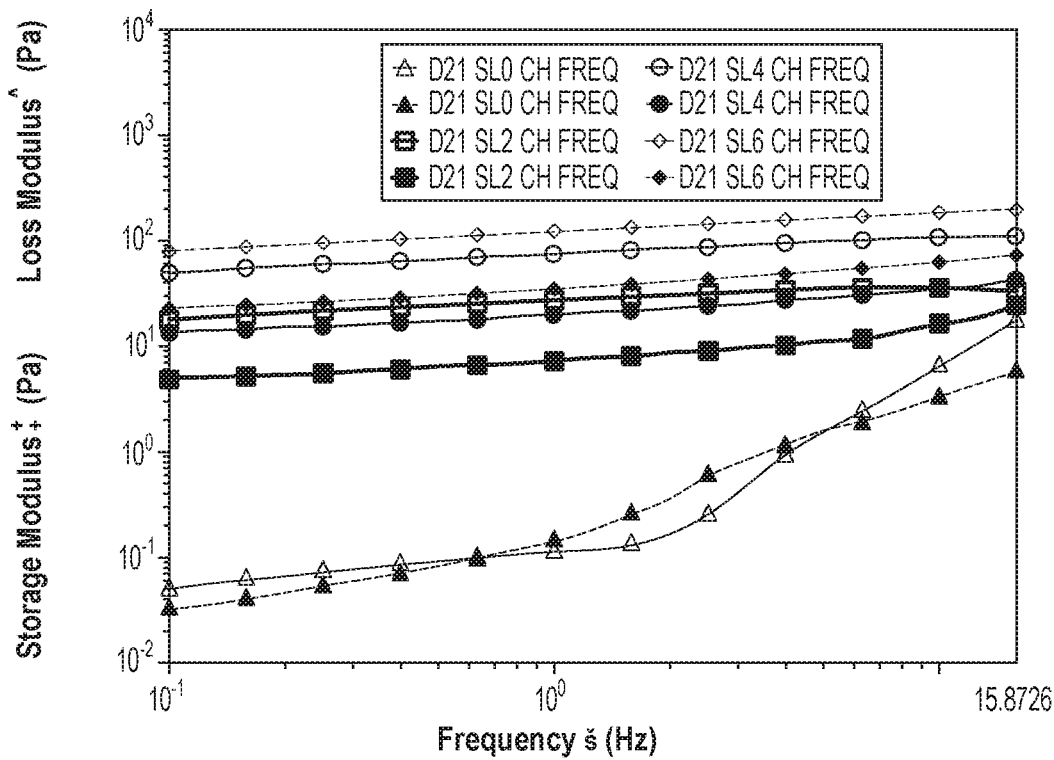
FIG. 2B is a plot of storage modulus and loss modulus as a function of oscillatory frequency for mixtures of camel-milk products with plant-based protein additive for different concentrations of additive at day twenty-one, the samples being fermented with CH starter culture.
Figure 3A:
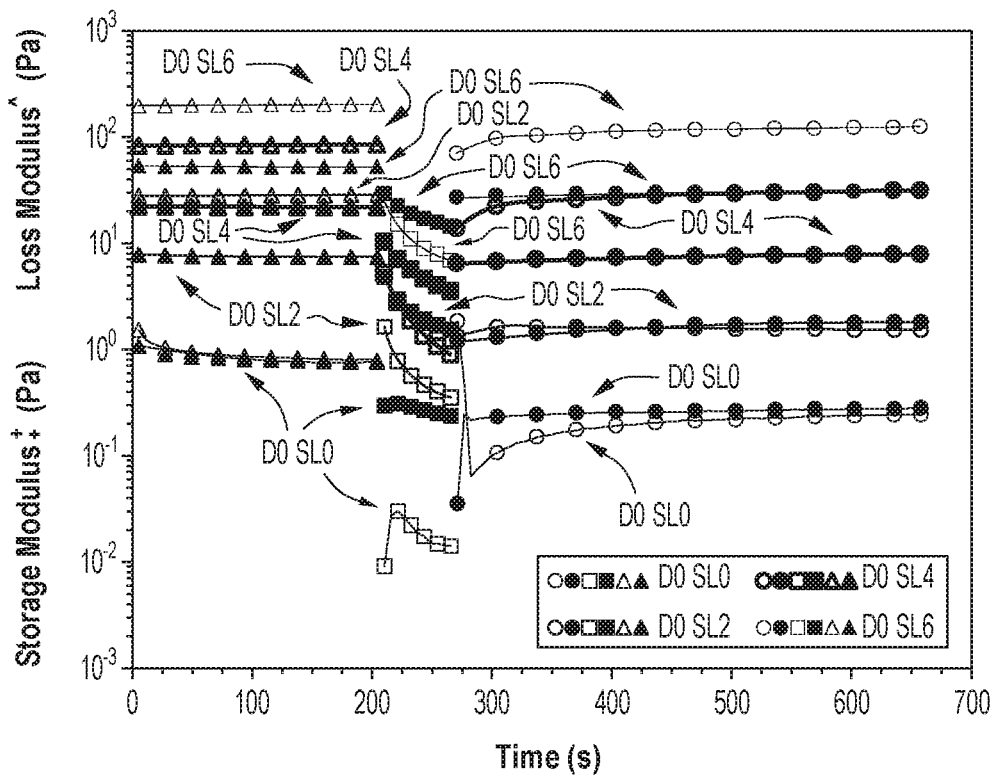
FIG. 3A is a plot of storage modulus and loss modulus as a function of time for mixtures of camel-milk products with plant-based protein additive for different concentrations of additive at day zero, showing the thixotropic behavior of the mixtures.
Figure 3B:
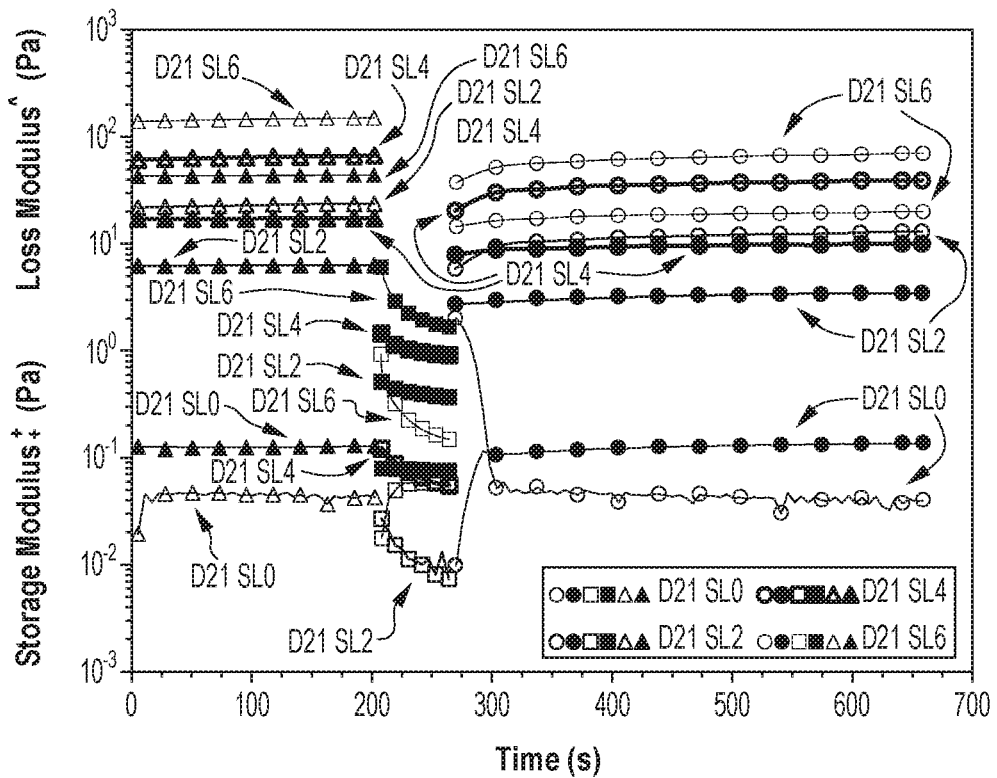
FIG. 3B is a plot of storage modulus and loss modulus as a function of time for mixtures of camel-milk products with plant-based protein additive for different concentrations of additive at day twenty-one, showing the thixotropic behavior of the mixtures.

The rheological properties of the fermented camel milk were assessed during storage at day 0 and day 21 at four concentrations, including SL0, SL2, SL4, SL6, which refer to 0, 2, 4 and 6% wt./vol plant-based protein in the initial mixture. Amplitude sweep was employed to determine the linear viscoelastic region of the fermented camel milk in the strain range of (0.1-100%) and at a constant frequency of 1.0 Hz. Frequency test was used to evaluate the viscoelastic behavior of (SL0, SL2, SL4, SL6) at various frequencies ranging from 0.1 Hz to 100 Hz at constant strain within the linear viscoelastic region (less than 2%) (FIGS. 2A-2B). For the thixotropic test (FIGS. 3A-3B), the viscoelastic parameters storage (G') and loss (G") moduli were recorded using the oscillation-time test at frequency 1.0 Hz for all samples at day 0 and day 21. Three time segments were applied with the following conditions: (1) first time (200 s, stress 0.2 Pa), (2) a second time (60 s, stress 50 Pa), and (3) a third time (400 s, stress 0.2 Pa).

Example 3

Methods of Making Specific Camel-Milk Products

For set-yogurt starting from camel milk powder, the process includes first, reconstituting camel milk powder with tap water at room temperature to reach 12.5% of total solid to prepare reconsituted camel milk (RCM); second, mixing the RCM either with plant-based milk, plant-based powder, or another plant-based protein additive (the mixing percentage is based on the final protein content of the plant product in the RCM, and therefore, the final protein content of the plant products could 6%, 5%, 4 or 3% proteins, the mixing percentage being based on the final protein content of the plant product in the RCM; the plant-based protein can be derived from either oat, soybean, lupin, quinoa, chickpea, or navy beans); third, storing the mixture (RCM+P) in fridge at 4° C. overnight (this step can be skipped in case of continuous production); fourth, heating the mixture from the third step at 73° C./15 min, 85° C./15 min, or 90-95° C./5 min; fifth, cooling the heated mixture to 40-43° C.; sixth, inoculating the mixture with (1-2%, or particularly ~1.5%) starter culture for set-yogurt (the starter culture could be any two lactic acid bacteria species described as generally recognized as safe (GRAS) by authorities, such as *Lactobacillus bulgaricus* and *Streptococcus thermophilus*); seventh, dispensing the inoculated mixture in cups (200 g, 250 g, 500 g, or 1000 g, as desired); eighth, incubating the inoculated mixture from the seventh step at 40-43° C. until pH reaches 4.6-4.5; ninth, cooling the product from the eighth step to 12-15° C. by cold air; and tenth, storing the product from the ninth step in refrigerator at 4° C. for next day (overnight) (the product may be stored at 4° C. for 21 days, at least).

For set-yogurt starting from fresh camel milk, the process includes first, standardizing the fat content of the fresh camel milk to 0.1% for skim-fat, 1% for low fat, or 3% for full fat; second, pasteurizing the camel milk from the first step at 63° C. for 30 min or 73° C. for 15 seconds; third, mixing the pasteurized camel milk either with plant-based milk, plant-based powder, or other plant-based protein additive (the mixing percentage is based on the final protein content of the plant product in the final camel-milk product, which could be 6%, 5%, 4%, or 3%; the plant types are either oat, soybean, lupin, quinoa, chickpea, or navy beans); fourth, storing the mixture from the third step in a fridge at 4° C. overnight (this step can be skipped in the case of continuous production); fifth, heating the mixture from the fourth step at 85° C./15 min or 90-95° C./5 min; sixth, cooling the heated mixture from the fifth step to 40-43° C.; seventh, inoculating the mixture with (1-2%, or particularly ~1.5%) starter culture for set-yogurt (the starter culture could be any two lactic acid bacteria species described as GRAS by authorities, such as *Lactobacillus bulgaricus* and *Streptococcus thermophilus*); eighth, dispensing the inoculated mixture in cups (200 g, 250 g, 500 g, or 1000 g); ninth, incubating the inoculated mixture from the eighth step at 40-43° C. until pH reaches 4.6-4.5; tenth, cooling the product from the ninth step to 12-15° C. by cold air; and eleventh, storing the product from the tenth step in fridge at 4° C. for around 12 hours (overnight) (the product from the eleventh step could be stored at 4° C. for at least 21 days).

For stir-yogurt with flavor starting from camel milk powder (flavored product), the process includes first, reconstituting camel milk powder with tap water at room temperature to reach 12.5% of total camel milk solids to prepare RCM; second, mixing the RCM either with plant-based milk, plant-based powder, or other plant-based protein additive (the mixing percentage is based on the final protein content of the plant product in the RCM, which could be 6%, 5%, 4%, or 3%; the plant types are either oat, soybean, lupin, quinoa, chickpea, or navy beans); third, storing the mixture (RCM+P) in fridge at 4° C. overnight (this step can be skipped in a case of continuous production); fourth, heating the mixture from the third step at 73° C./15 seconds, 85° C./15 min, 90-95° C./5 min; fifth, cooling the heated mixture from the fourth step to 40-43° C.; sixth, inoculating the mixture with (1-2%, or specifically ~1.5%) starter culture for set-yogurt (the starter culture could be any two lactic acid bacteria species described as GRAS by authorities, such as *Lactobacillus bulgaricus* and *Streptococcus thermophilus*); seventh, incubating the inoculated mixture from the sixth step at 40-43° C. until the pH reaches 4.6-4.5; eighth, mixing the product from the seventh step with a preferred flavor and/or fruit or other mix-in; ninth, dispensing the product from the eighth step into cups (200 g, 250 g, 500 g, or 1000 g), followed by sealing the cups; tenth, cooling the product from the ninth step to 12-15° C. by cold air; and eleventh, storing the product from the tenth step in fridge at 4° C. for approximately 12 hours or overnight (the product from the eleventh step may be stored at 4° C. for at least 21 days).

For stir-yogurt with flavor starting from fresh camel milk (flavored product), the process involves first, standardizing the fat content in the fresh camel milk to 0.1% skim, 1% low fat or 3% full fat; second, pasteurizing the camel milk from the first step at 63° C. for 30 min or 73° C. for 15 seconds; third, mixing the pasteurized camel milk either with plant-based milk, plant-based powder, or other plant-based protein additives (the mixing percentage is based on the final protein content of the plant-based protein in the final camel-milk product, which could be 6%, 5%, 4%, or 3%; the plant types are either oat, soybean, lupin, quinoa, chickpea, or navy beans); fourth, storing the mixture from the third step in fridge at 4° C. overnight (this step can be skipped in case of continuous production); fifth, next day, heating the mixture from the fourth step at 85° C./15 min, 90-95° C./5 min; sixth, cooling the heated mixture from the fifth step to 40-43° C.; seventh, inoculating the mixture with (1-2%, or ~1.5%) starter culture for set-yogurt (the starter culture could be any two lactic acid bacteria species described as GRAS by authorities, such as *Lactobacillus bulgaricus* and *Streptococcus thermophilus*); eighth, incubating the inoculated mixture from the seventh step at 40-43° C. until the pH reaches 4.6-4.5; ninth, mixing the product from the eighth step with the preferred flavor and/or fruit; tenth, dispensing the product from the ninth step in cups (200 g, 250 g, 500 g, or 1000 g), followed by sealing the cups; eleventh, cooling the product from the tenth step to 12-15° C. by cold air; and twelfth, storing the product from the eleventh step in fridge at 4° C. for around 12 hours or overnight (the product could be stored at 4° C. for at least 21 days).

For Labanah (concentrated yogurt) starting from camel milk powder, the process involves first, reconstituting camel milk powder with tap water at room temperature to reach 12.5% of total camel milk solids to prepare RCM; second, mixing the RCM either with plant-based milk, plant-based powder, or another plant-based protein additive (the mixing percentage is based on the final protein content of the plant product in the RCM, which may be 6%, 5%, 4%, or 3%; the plant-based protein can be derived from either oat, soybean, lupin, quinoa, chickpea, or navy beans); third, storing the mixture (RCM+P) in fridge at 4° C. overnight (this step can be skipped in case of continuous production); fourth, heating the mixture from the third step at 73° C./15 seconds, 85° C./15 min or 90-95° C./5 min; fifth, cooling the heated mixture from the fourth step to 40-43° C.; sixth, inoculating the mixture with (1-2% or ~1.5%) starter culture for set-yogurt (the starter culture could be any two lactic acid bacteria species described as GRAS by authorities, such as *Lactobacillus bulgaricus* and *Streptococcus thermophilus*); seventh, incubating the inoculated mixture from the sixth step at 40-43° C. until pH reaches 4.6-4.5; eighth, mixing the product from the seventh step; ninth, transferring the product from the eighth step to a cheese cloth or cheese cloth bags to drain moisture at 4° C. overnight, or using a yogurt mechanical separator to remove moisture from the fermented product; and tenth, dispensing the product from the ninth step into filling cups in sizes 200 g, 300 g, or 500 g (the product may be stored at 4° C. for at least 14 days).

For making Nabulsi white-brined cheeses starting from fresh camel milk. the process includes first, standardizing the fresh camel milk based on a desired fat:casein ratio; second, pasteurizing the standardized camel milk at 63° C. for 30 min or 73° C. for 15 seconds; third, cooling the pasteurized camel milk to 25° C.; fourth, mixing the pasteurized camel milk either with plant-based milk, plant-based powder, or other plant-based protein additives (the mixing percentage is based on the final protein content of the plant-based protein in the final camel-milk product, which may be 6%, 5%, 4%, or 3%; the plant-based protein can be derived from either oat, soybean, lupin, quinoa, chickpea, or navy beans); fifth, storing the mixture from the fourth step in fridge at 4° C. overnight (this step can be skipped in case of continuous production); sixth, tempering the product from the fifth step at 32-35° C. for 30 min; seventh, adding camel-chymosin (e.g., as sold by Chr-Hansen Company) to coagulate the product from the sixth step; eighth, confirming coagulation after keeping the product from the seventh step at 32-35° C. for 40-45 min; ninth, cutting the curd into 1 cm cubes using cheese knives; tenth, stirring the curd cubes with whey for 10-20 min at 40° C.; eleventh, transferring the curd to cheese cloth to press curd into molds 1000 g-2000 g; twelfth, pressing cheese with heavy weight (each 1 kg weight of curd was pressed with 60 kg weight) to remove moisture from cheese blocks for at least 4 to 5 hours; thirteenth, cutting pressed cheese into 4×4×1.5 cm pieces; fourteenth, transferring pieces into brine solution 21%; fifteenth, storing the product from the fourteenth step in brine solution overnight at room temperature; sixteenth; next day, immersing the pieces from the fifteenth step into boiled brine solution for 5 min until temperature inside cheese reaches to 80° C.; seventeenth, transferring the heat-treated cheese from the sixteenth step into cold brine solution 15%; and eighteenth, storing the product at low temperature ~5° C. for 6 months.

For making Akawi white-brined cheeses starting from fresh camel milk, the process includes first, standardizing the fresh camel milk based on a desired fat:casein ratio; second, pasteurizing the standardized camel milk at 63° C. for 30 min or 73° C. for 15 seconds; third, cooling the pasteurized camel milk to 25° C.; fourth, mixing the pasteurized camel milk either with plant-based milk, plant-based powder, or another plant-based protein additive (the mixing percentage is based on the final protein content of the plant-based protein in the final camel-milk product, which may be 6%, 5%, 4%, or 3%; the plant-based protein can be derived from either oat, soybean, lupin, quinoa, chickpea, or navy beans); fifth, storing the mixture from the fourth step in fridge at 4° C. overnight (this step can be skipped in case of continuous production); sixth, inoculating the mixture with (1-2% or ~1.5%) starter culture for set-yogurt (the starter culture could be any two lactic acid bacteria species described as GRAS by authorities such as *Lactobacillus bulgaricus* and *Streptococcus thermophilus*); seventh, adding camel-chymosin (e.g., as sold by Chr-Hansen Company) to coagulate the product from the sixth step; eighth, confirming coagulation after keeping the product from the seventh step at 32-35° C. for 40-45 min; ninth, cutting the curd into 1-cm cubes; tenth, stirring the curd cubes with whey for 10-20 min at 40° C.; eleventh, transferring the curd to cheese cloth and pressing the curd into 250 g or 500 g molds to form cheese; twelfth, pressing the cheese with heavy weight (each 1 kg weight of curd was pressed with 60 kg weight) to remove moisture from the cheese for at least 4 to 5 hours; thirteenth, cutting the pressed cheese into 4×4×1.5 cm pieces; fourteenth, transferring pieces into brine solution of 10% brine; and fifteenth, storing the product from the fourteenth step in brine solution at 4° C. for 14 days.

It is to be understood that the camel-milk products with plant-based protein additive are not limited to the specific embodiments described above, but encompass any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. Camel-milk gel products with plant-based protein additive, consisting of coagulated products of a mixture consisting of:
   camel milk; and
   a non-hydrolysate plant-based protein additive mixed with the camel milk, wherein the non-hydrolysate plant-based protein consists of a non-hydrolysate plant protein made from a plant selected from the group consisting of lupin, quinoa, chickpea, and navy beans and consists of between 3-6% wt./vol of the mixture and the mixture was incubated at 40-43° C. and attained a pH of 4.6.

2. The camel-milk gel products of claim 1, wherein the plant-based protein is a protein contained in a plant-based product selected from the group consisting of a plant-based milk, a plant-based milk powder, and derivatives thereof.

3. The camel-milk gel products of claim 1, wherein the camel milk comprises milk selected from the group consisting of whole camel milk, skimmed camel milk, semi-skimmed camel milk, evaporated camel milk, condensed camel milk, camel milk cream, powdered camel milk and reconstituted powdered camel milk.

4. The camel-milk gel products of claim 1, wherein the coagulated products are products selected from the group consisting of fermented dairy products, cheeses, and custard-based products.

5. The camel-milk gel products of claim 4, wherein the coagulated products are fermented dairy products.

6. The camel-milk gel products of claim 5, wherein the fermented dairy product is a yoghurt selected from the group consisting of a set yogurt, stir yogurt, drinking yogurt, frozen yogurt and concentrated yogurt.

7. The camel-milk gel products of claim 4, wherein the coagulated product is a cheese.

8. The camel-milk gel products of claim 7, wherein the cheese is a chymosin-coagulated cheese.

9. The camel-milk gel products of claim 4, wherein the coagulated product is a custard-based product.

10. The camel-milk gel product of claim 1, wherein the mixture comprises between 10-15% camel milk solids.

11. The camel-milk gel product of claim 10, wherein the mixture comprises 12.5% camel milk solids.

12. A method of preparing a camel-milk gel product, consisting of the steps of:
   mixing camel milk with a non-hydrolysate plant-based protein additive to form a liquid mixture, wherein the non-hydrolysate plant-based protein is selected from the group consisting of lupin protein, quinoa protein, chickpea protein, or navy bean protein and consists of between 3-6% wt./vol of the mixture;
   adding a coagulant to the mixture to obtain the camel-milk product; and
   incubating the mixture at 40-43° C. to attain a pH of 4.6.

13. The method of claim 12, wherein the plant-based protein additive comprises a plant-based milk, a plant-based milk powder, or a derivative thereof.

14. The method of claim 12, wherein the camel milk comprises whole camel milk, skimmed camel milk, semi-skimmed camel milk, evaporated camel milk, condensed camel milk, camel milk cream, powdered camel milk or reconstituted powdered camel milk.

15. The method of claim 12, wherein the camel-milk product is a fermented dairy product, a cheese, or a custard-based product.

16. The method of claim 12, wherein the mixture comprises between 10-15% camel milk solids.

17. The camel-milk gel products of claim 2, wherein the non-hydrolysate plant-based protein additive is a plant-based milk.

* * * * *